(12) United States Patent
Suanno et al.

(10) Patent No.: US 11,999,420 B2
(45) Date of Patent: Jun. 4, 2024

(54) TRACK ROLLER FOR UNDERCARRIAGE SYSTEM HAVING INVERTED SEAL, AND ROLLER RIM FOR SAME

(71) Applicant: Caterpillar Inc., Peoria, IL (US)

(72) Inventors: Gennaro Suanno, Peoria, IL (US); Andrea Cinquanta, Castelvetro di Modena (IT); Graziano Nozza, Solignano Nuovo (IT)

(73) Assignee: Caterpillar Inc., Peoria, IL (US)

( * ) Notice: Subject to any disclaimer, the term of this patent is extended or adjusted under 35 U.S.C. 154(b) by 600 days.

(21) Appl. No.: 17/214,371

(22) Filed: Mar. 26, 2021

(65) Prior Publication Data

US 2022/0306219 A1    Sep. 29, 2022

(51) Int. Cl.
*B62D 55/15*    (2006.01)
*B62D 55/092*    (2006.01)

(52) U.S. Cl.
CPC .......... *B62D 55/15* (2013.01); *B62D 55/092* (2013.01)

(58) Field of Classification Search
CPC ...... B62D 55/14; B62D 55/15; B62D 55/092; F16J 15/348; F16J 15/3464
See application file for complete search history.

(56) References Cited

U.S. PATENT DOCUMENTS

| | | | |
|---|---|---|---|
| 3,180,648 A * | 4/1965 | Kupfert | F16J 15/344 277/390 |
| 3,392,984 A | 7/1968 | Reinsma et al. | |
| 3,871,719 A * | 3/1975 | Boggs | B62D 55/15 384/418 |
| 4,209,205 A * | 6/1980 | Gregg | B62D 55/15 305/119 |
| 5,251,913 A * | 10/1993 | Passini | B62D 55/14 277/369 |
| 6,364,438 B1 | 4/2002 | Hasselbusch et al. | |
| 7,108,337 B2 * | 9/2006 | Yamamoto | B62D 55/15 305/129 |
| 8,979,219 B2 | 3/2015 | Hisamatsu | |
| 9,745,005 B2 | 8/2017 | Johannsen | |
| 2011/0121643 A1 | 5/2011 | Mulligan | |

(Continued)

FOREIGN PATENT DOCUMENTS

| | | |
|---|---|---|
| EP | 1088748 | 4/2001 |
| KR | 102061133 | 12/2019 |
| WO | 2020217993 A1 | 10/2020 |

*Primary Examiner* — Jason R Bellinger

(57) ABSTRACT

A track roller for a ground-engaging track system includes a roller rim defining a roller axis and including a first seal bore formed in a first axial end and a second seal bore formed in a second axial end. A roller shaft extends through the first seal bore and the second seal bore, and may include a straight shaft having an uninterrupted cylindrical outer surface. A first seal assembly includes a first outer seal carrier interference-fitted within the first seal bore, and a second seal assembly includes a second outer seal carrier interference-fitted within the second seal bore. The first seal assembly and the second seal assembly include a first face seal and a second face seal, respectively, each including an outer seal ring and an outer seal element, and an inner seal ring and an inner seal element, where each outer seal element is radially inward of the respective outer seal ring and squeezed in radial compression to form a fluid seal with the respective outer seal carrier.

20 Claims, 3 Drawing Sheets

(56) References Cited

U.S. PATENT DOCUMENTS

2012/0056473 A1* 3/2012 Hashimoto ............ B62D 55/14
305/136
2020/0386271 A1 12/2020 Abello et al.

* cited by examiner

TRACK ROLLER FOR UNDERCARRIAGE SYSTEM HAVING INVERTED SEAL, AND ROLLER RIM FOR SAME

TECHNICAL FIELD

The present disclosure relates generally to a track roller for an undercarriage system, and more particularly to a track roller having an inverted seal in a face seal assembly.

BACKGROUND

Track-type machines are used throughout the world in a variety of off-highway environments, including for applications such as mining, construction, forestry, road building, at landfills, and many others. A typical track-type machine includes a ground-engaging track positioned at each side of a machine frame. The ground-engaging track extends about a plurality of rotatable track-contacting elements including one or more idlers, a drive sprocket, and track rollers. The ground-engaging tracks can be advanced in a first direction to move the track-type machine forward, in a reverse direction to move the track-type machine back, and at differing speeds to change a travel direction or orientation of the track-type machine.

Track-type machines tend to be quite heavy both as a necessity for certain working applications and also because the large and complex parts of the machinery are generally built to be quite robust and heavy duty. The operating conditions experienced by track-type machines can also be quite rugged, pushing heavy loads, traveling over steep terrain, and interacting with coarse and abrasive substrate materials. The track rollers typically carry much of the weight of the track-type machine and rotate continuously as the track-type machine travels. For this reason, track rollers are typically constructed to withstand a range of types of loading that can be severe in magnitude, repetitive, and variable depending upon how the track-type machine is used. Engineers have developed a variety of lubrication strategies for track rollers in an effort to optimize field performance and service life.

In one common track roller design, metal face seals are used to provide a rotating but fluidly sealed interface between track rollers and a supporting roller shaft. Face seals and associated assemblies have been used for many years with great success. In certain applications, however, existing sealing strategies can experience relatively high speeds of the rotating face seal components relative to one another, eventually resulting in performance degradation or failure. Efforts to accommodate various sealing strategies can also complicate the engineering and design of other parts of a track roller. One known track roller assembly configuration is set forth in U.S. Pat. No. 6,364,438 to Hasselbusch et al. In Hasselbusch et al., a roller assembly has a roller body and a roller shaft. A retainer is press-fit into an access opening in the roller body. An axial thrust bearing is interposed an outwardly extending flange of the roller shaft and a retainer. While Hasselbusch et al. undoubtedly has various applications, there is always room for improvement and development of alternative strategies.

SUMMARY OF THE INVENTION

In one aspect, a track roller for a ground-engaging track system includes a roller body defining a roller axis and including a first axial end having a first seal bore formed therein, and a second axial end having a second seal bore formed therein. The track roller further includes a roller shaft extending through the first seal bore and the second seal bore. The track roller further includes a first seal assembly having a first outer seal carrier within the first seal bore and fixed to rotate with the roller body about the roller shaft, a first inner seal carrier fixed to the roller shaft, and a first face seal. The track roller further includes a second seal assembly having a second outer seal carrier within the second seal bore and fixed to rotate with the roller body about the roller shaft, a second inner seal carrier fixed to the roller shaft, and a second face seal. The first face seal and the second face seal each include an outer seal ring and an outer seal element, supported in the respective outer seal carrier, and an inner seal ring and an inner seal element, supported in the respective inner seal carrier. Each outer seal element is radially inward of the respective outer seal ring and squeezed in radial compression to form a fluid seal with the respective outer seal carrier.

In another aspect, a track roller for a ground-engaging track system includes a roller body having an outer tread surface, and an inner surface forming a first seal bore, a second seal bore, and a shaft bore defining a roller axis and extending between the first seal bore and the second seal bore. The track roller further includes a roller shaft, and a seal assembly including an outer seal carrier within the first seal bore and fixed to rotate with the roller body about the roller shaft, and a face seal. The face seal includes an outer seal ring and an outer seal element, supported in the outer seal carrier, and an inner seal ring and an inner seal element. The outer seal element is radially inward of the outer seal ring and squeezed in radial compression between the outer seal ring and the outer seal carrier.

In still another aspect, a body for a track roller in an undercarriage system includes a roller shell defining a roller axis extending between a first roller shell axial end and a second roller shell axial end, and having an outer tread surface extending circumferentially around the roller axis and axially between a first roller shell end flange and a second roller shell end flange. The roller shell further includes a first seal bore formed in the first roller shell axial end, a second seal bore formed in the second roller shell axial end, and a shaft bore extending axially between the first seal bore and the second seal bore and circumferentially around the roller shell axis. The roller shell further includes a centrally located oil cavity in communication with the shaft bore, a first inside bearing surface exposed to the shaft bore and extending axially from the oil cavity to the first seal bore, and a second inside bearing surface exposed to the shaft bore and extending axially from the oil cavity to the second seal bore. The roller shell further includes a first oil channel and a second oil channel, each formed radially outward of the shaft bore, and extending axially between the oil cavity and the first seal bore and the second seal bore, respectively.

DETAILED DESCRIPTION

Figure 1:
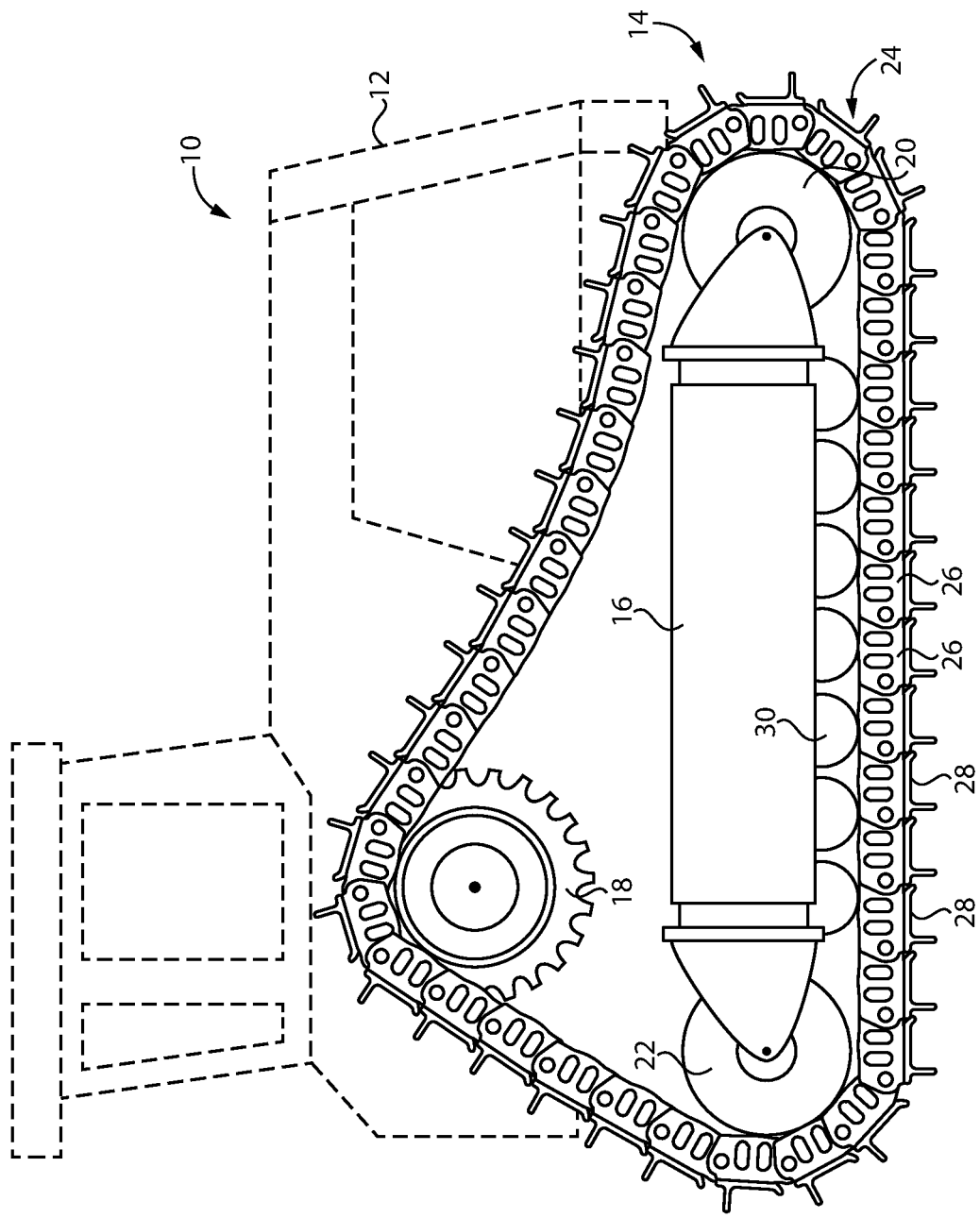
FIG. 1 is a side diagrammatic view of a machine, according to one embodiment.

Referring to FIG. 1, there is shown a track-type machine 10 according to one embodiment. Machine 10 is shown in the context of a track-type tractor, however, in other embodiments machine 10 might be a track-type loader, an excavator, a mining machine in the nature of a shovel, a half-track machine, or still others. Machine 10 includes a frame 12 and will typically have a hydraulically actuated implement system (not shown) coupled to frame 12. Machine 10 also includes an undercarriage system or ground-engaging track system 14. System 14 includes a track roller frame 16, a drive sprocket 18, a front idler 20, a back idler 22, a plurality of track rollers 30, and a ground-engaging track 24. Track 24 includes a plurality of track links 26 coupled together in an end-to-end arrangement, typically in two parallel chains, and attached to a plurality of track shoes 28. Track 24 will typically be one track positioned at one side of machine 10, with a substantially identical track positioned at an opposite side of machine 10. System 14 is shown in a so-called "high drive" configuration, but could instead be an oval track configuration, or still another. As will be further apparent from the following description, track rollers 30 may be uniquely configured with simplified and efficient construction and sealing amongst rotating components.

Figure 2:
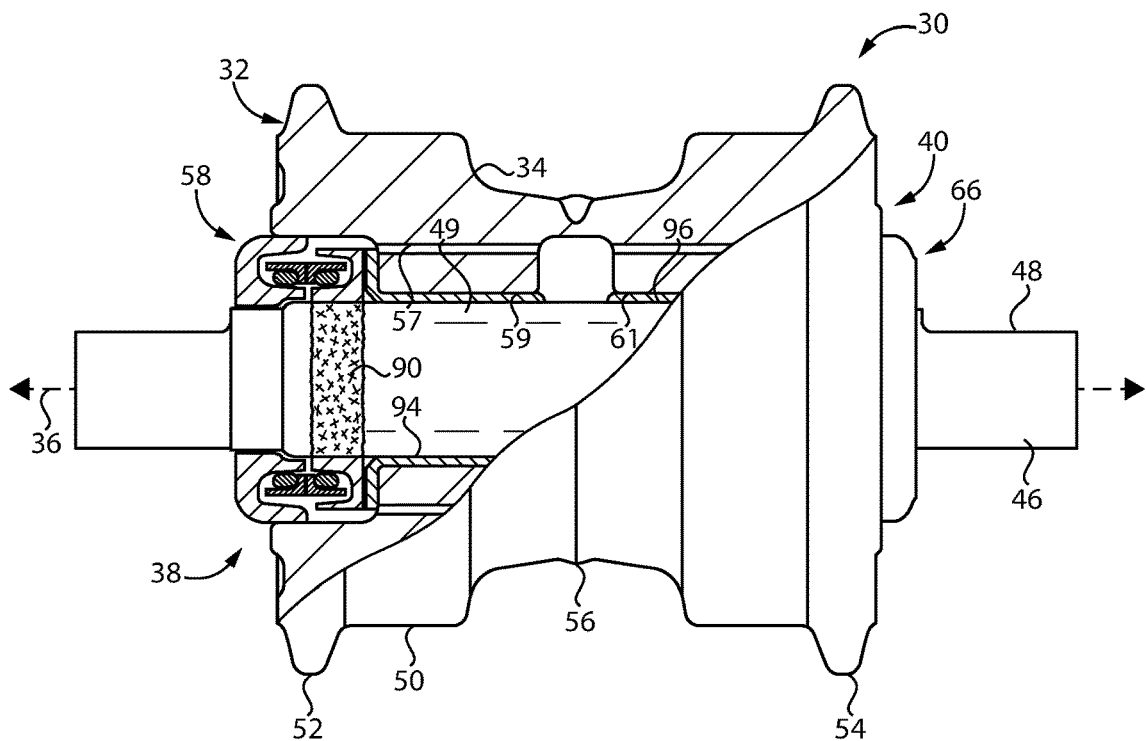
FIG. 2 is a partially sectioned front view of a track roller, according to one embodiment.
Figure 3:
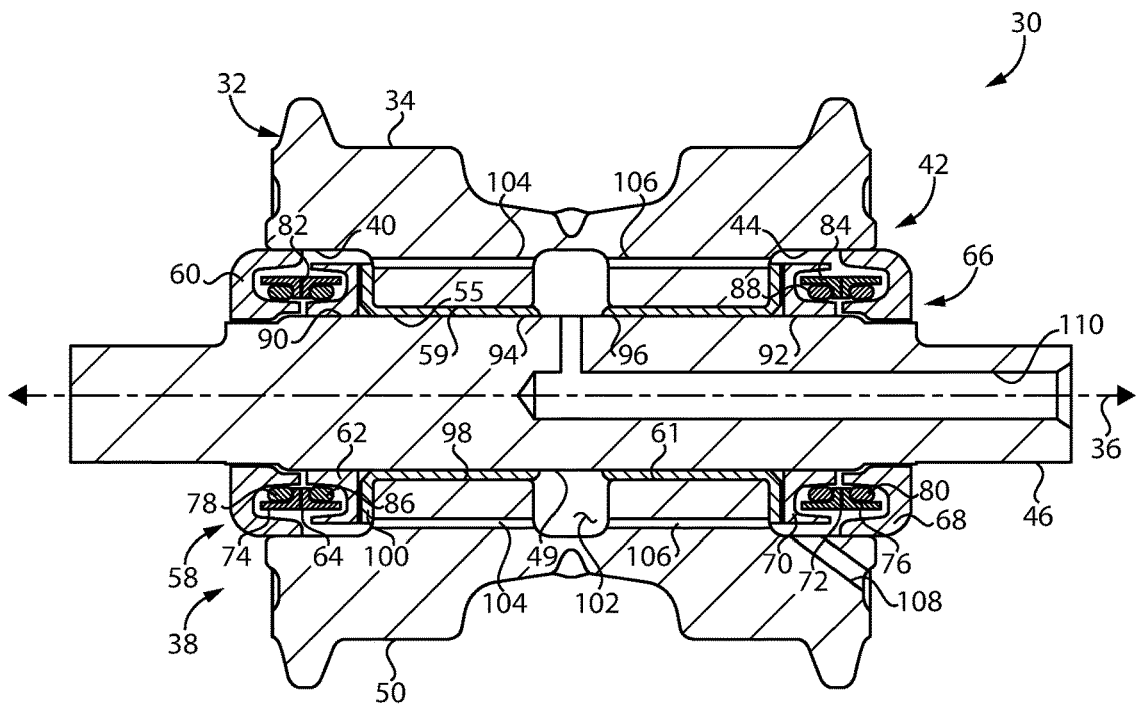
FIG. 3 is a sectioned diagrammatic view of a track roller as in FIG. 2.

Referring also now to FIGS. 2 and 3, there is shown one of track rollers 30 in greater detail. Each track roller 30, hereinafter referred to at times in the singular, includes a roller body 32 having a roller shell 34 defining a roller axis 36. Roller body 32 and roller shell 34 are referred to interchangeably herein. It should be appreciated that a roller "body" may include a roller shell and additional attached components, such as pressed-in or otherwise interference-fitted components, whereas a roller "shell" refers to the one-piece shell only. Roller body 34 includes a first roller shell axial end 38 having a first seal bore 40 formed therein, and a second roller shell axial end 42 having a second seal bore 44 formed therein. Roller shell 34 includes an outer tread surface 50 extending circumferentially around roller axis 36 and axially between a first roller shell end flange 52 and a second roller shell end flange 54. A shaft bore 57, which can be understood to define roller axis 36, extends axially between first seal bore 40 and second seal bore 44. A roller shaft 46 extends through first seal bore 40 and second seal bore 44 and through shaft bore 57. In one implementation, roller shell 34 is formed by two shell pieces attached such as by friction welding at a weld joint 56. Each of first seal bore 40, second seal bore 44, and shaft bore 57 may be understood to be defined by an inner surface 55 of roller shell 34. Roller shell 34 further forms a centrally located oil cavity 102 in communication with shaft bore 57, a first inside bearing surface 59 exposed to shaft bore 57 and extending axially from oil cavity 102 to first seal bore 40, and a second inside bearing surface 61 exposed to shaft bore 57 and extending axially from oil cavity 102 to second seal bore 44. Roller shaft 46 may include a flat 48, upon one end thereof, and typically another flat (not numbered) upon an opposite end thereof, whereby roller shaft 46 can be mounted to track roller frame 16 such as by way of clamping collars or the like. Bolt bores (not shown) may extend through roller shaft 46 and open in the subject flats. Roller shaft 46 is a straight shaft, including a cylindrical outer surface 49 uninterrupted in profile between first seal bore 40 and second seal bore 44. Track roller 30 further includes a first seal assembly 58 and a second seal assembly 66, with outer cylindrical surface 49 also uninterrupted in profile between first seal assembly 58 and second seal assembly 66. Each of first seal assembly 58 and second seal assembly 66 can be understood as a metal face seal assembly.

First seal assembly 58 includes a first outer seal carrier 60 within first seal bore 40 and fixed to rotate with roller body 32 about roller shaft 46. First seal assembly 58 also includes a first inner seal carrier 62 fixed to roller shaft 46, and a first face seal 64 (a metal face seal). Second seal assembly 66 includes a second outer seal carrier 68 within second seal bore 44 and fixed to rotate with roller body 32 about roller shaft 46, a second inner seal carrier 70 fixed to roller shaft 46, and a second face seal 72 (a metal face seal). In an embodiment, first inner seal carrier 62 and second inner seal carrier 70 are interference-fitted upon roller shaft 46. Roller shaft 46 may include a first knurled surface 90 and a second knurled surface 92, each extending circumferentially around roller axis 36 and first inner seal carrier 62 and second inner seal carrier 70 may be interference-fitted upon roller shaft 46 upon first knurled surface 90 and second knurled surface 92, respectively. First outer seal carrier 60 and second outer seal carrier 68 may be interference-fitted with roller body 32 within first seal bore 40 and second seal bore 44, respectively. Due to the relatively short axial interference-fit length available, knurled surfaces 90 and 92 can be used to enhance the strength of the interference-fits. In an alternative embodiment, a snap ring (not shown) upon roller shaft 46 may be used in conjunction with an interference-fit, or instead of an interference-fit, to fix first inner seal carrier 62 and second inner seal carrier 70 to roller shaft 46. Snap rings of this nature would typically be positioned axially outward of first inner seal carrier 62 and second inner seal carrier 70, respectively, such that first inner seal carrier 62 and second inner seal carrier 70 are each trapped between a snap ring seated in a groove upon roller shaft 56 and roller shell 34.

First face seal 64 and second face seal 72 may each include a metal face seal, forming a sealed interface between metallic components rotatable relative to one another. First face seal 64 and second face seal 72 each include an outer seal ring 74 and 76, respectively, and an outer seal element 78 and 80, respectively, supported in the respective outer seal carrier 60 and 68. Each of first face seal 64 and second face seal 72 further includes an inner seal ring 82 and 84, respectively, and an inner seal element 86 and 88, respectively, supported in the respective inner seal carrier 62 and 70. Each outer seal element 78 and 80 is radially inward of the respective outer seal ring 74 and 76 and squeezed in radial compression to form a fluid seal with the respective outer seal carrier 60 and 68. As can be seen in the Figures, outer seal elements 78 and 80 are positioned within voids in the respective outer seal carriers 60 and 68, and compressed axially inward and radially inward by the interference-fitted installation of outer seal carriers 60 and 68 and interactions with sloped surfaces of outer seal carriers 60 and 68 and/or sloped surfaces of outer seal rings 74 and 76. As used herein the terms "axially inward" and "axially outward" refer to directions along roller axis 36 toward and away from, respectively, a center point of a line segment of roller axis 36 within roller shaft 46. The terms "radially outward" and "radially inward" mean away from and toward roller axis 36, respectively. Thus, first outer seal carrier 60 is axially outward of first inner seal carrier 62, for example. Each of the respective seal rings 74, 76, 82, and 84 can include metallic seal rings annular in form and having sealing faces (not numbered) in abutment but typically separated by a thin layer of lubricating oil. Each of the respective seal elements 78, 80, 86, and 88 can include non-metallic seal elements annular in form having a circular, oval, polygonal, or other cross section, and generally referred to in the art as a toric.

Track roller 30 further includes a first bearing 94 interference-fitted upon roller shaft 46 inboard or axially inward of first inner seal carrier 62, and a second bearing 96 interference-fitted upon roller shaft 46 inboard or axially inward of second inner seal carrier 70. In the illustrated embodiment, first bearing 94 includes a journal sleeve 98 and a projecting thrust flange 100 attached to and integral with journal sleeve 98 and positioned within first seal bore 40. Journal sleeve 98 rotatably journals roller shell 34. Thrust flange 100 is trapped between roller body 32 and first inner seal carrier 62, and reacts thrust loads between roller body 32/roller shell 34 and first inner seal carrier 62. Second bearing 96 may be analogously configured with a journal sleeve and a projecting thrust flange.

As noted above roller body 32/roller shell 34 has a centrally located oil cavity 102 formed therein. Oil cavity 102 extends circumferentially around roller shaft 46. Roller body 32 also forms a first oil channel 104 extending from oil cavity 102 to first seal bore 40, and a second oil channel 106 extending from oil cavity 102 to second seal bore 44. In the illustrated embodiment first oil channel 104 and second oil channel 106 have the form of oil passages or cross-holes. First oil channel 104 and second oil channel 106 are spaced radially outward of first inside bearing surface 59 and second inside bearing surface 61, respectively. Oil channels 104 and 106 are thus understood to be spaced radially outward of first bearing 94 and second bearing 96, respectively. Each oil channel 104 can be one of a set of oil channels spaced from one another circumferentially around roller axis 36. Each oil channel 106 may likewise be one of a set of oil channels spaced circumferentially around roller axis 36. Also shown in FIG. 3 is an oil fill opening 108 formed in second axial end 42. Oil fill opening 108 can provide a feed of oil into a region of second seal assembly 66, which oil then can pass through an oil channel 106 and into oil cavity 102. Oil from oil cavity 102 can then flow through an oil channel 104 to first seal assembly 58. Also shown in FIG. 3 is another oil fill opening or cavity 110 formed in roller shaft 46. Oil fill opening 110 can enable a feed of oil to be conveyed through roller shaft 46 to oil cavity 102. In some embodiments only oil fill opening 108 might be used, in other embodiments only oil fill opening 110 might be used, and still other embodiments might use both. Oil fill openings herein are normally plugged when track roller 30 is placed in service.

Figure 4:
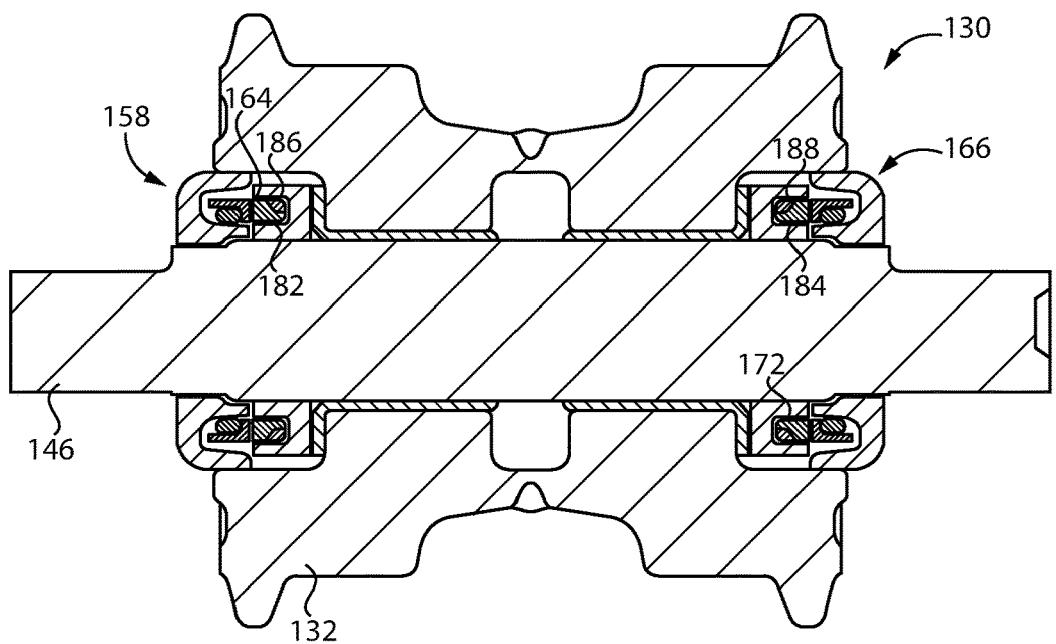
FIG. 4 is a sectioned diagrammatic view of a track roller, according to another embodiment.

Referring now to FIG. 4, there is shown a track roller 130 according to another embodiment. In track roller 130 a roller shaft 146 extends through a roller body 132. A first seal assembly 158 and a second seal assembly 166 are provided for purposes analogous to those described in connection with the foregoing embodiments. Each of seal assemblies 158 and 166 includes an outer seal carrier (not numbered) interference-fitted with roller body 132, and an inner seal carrier (not numbered) fixed to roller shaft 146, as well as bearings (not numbered) interference-fitted upon roller shaft 146. Whereas in the embodiment of FIG. 3 each inner seal element 86 and 88 is radially inward of the respective inner seal ring 82 and 84, in the embodiment of FIG. 4 a first inner seal element 186 and a second inner element 188 are radially outward of a first inner seal ring 182 and a second inner seal ring 184, respectively. Each of first seal assembly 158 and second seal assembly 166 is understood to form a face seal 164 and 172, respectively, but the separate assemblies of a seal ring and seal element are inverted relative to one another. Interference-fitting of bearings upon a roller shaft as described in connection with FIG. 3, and as will be understood also in the case of FIG. 4 and other embodiments contemplated herein, eliminates a possible oil feed path as is used in certain other track rollers. Absent an outer seal element and seal ring having the described configuration an oil flow path to the face seals could be problematic to achieve.

Figures 5, 6:
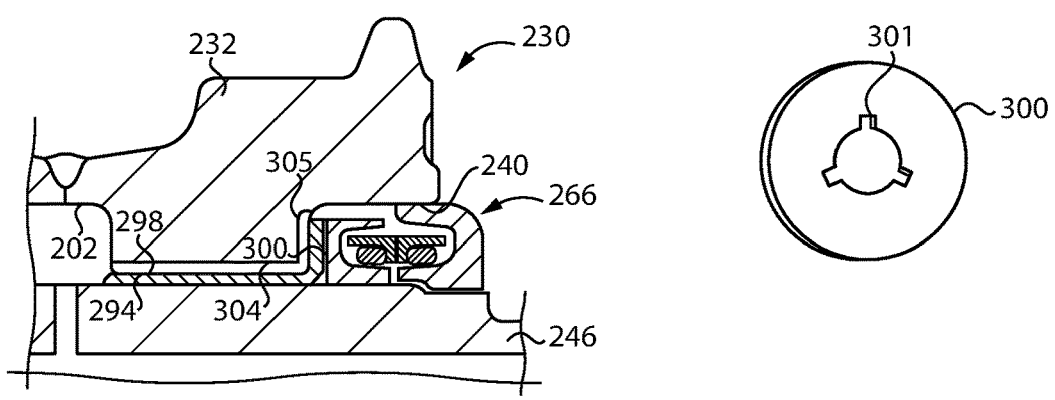
FIG. 5 is a sectioned view of a portion of a track roller, according to yet another embodiment.
FIG. 6 is a diagrammatic view of a floating washer suitable for use in the track roller of FIG. 5.

Referring to FIG. 5, there is shown a track roller 230 according to yet another embodiment. Track roller 230 includes a seal assembly 266, a roller body 232, and a seal assembly 266, within a seal bore 240, configured generally analogously to seal assemblies in any of the foregoing embodiments, positioned about a roller shaft 246 and at least partially within roller body 232. Roller body 232 has a centrally located oil cavity 202 formed therein, and an oil channel 304 in the nature of a groove positioned radially outward of a journal sleeve 298 of bearing 294 interference-fitted upon roller shaft 246. Groove 304 may be one of a plurality of grooves spaced circumferentially around a roller axis and provides an oil feed path from oil cavity 202 to seal assembly 266. Whereas groove 304 is axially extending, radially extending grooves formed in roller body 232, one of which is visible in the illustration of FIG. 5 and labeled 305, may extend from groove 304. A floating thrust washer 300 may be within seal bore 240 formed in body 232. Referring also to FIG. 6, floating thrust washer 300 includes a plurality of inside grooves 301 forming, together with roller shaft 246, a plurality of oil passages.

INDUSTRIAL APPLICABILITY

Referring to the drawings generally, but in particular returning to the embodiment of FIGS. 2 and 3, during operation roller shaft 46 may be held stationary by way of mounting to track roller frame 16. Roller shell 32 can rotate in contact with track 24 as track 24 is advanced about front idler 20, back idler 22, and drive sprocket 18. Outer seal carriers 60 and 68 will rotate with roller body 32 while inner seal carriers 62 and 70 will remain stationary, with rotation between interfacing components occurring at face seal 64 and face seal 72. Oil may be resident in oil cavity 102 and can be distributed by way of oil channels 104 axially outward to maintain a supply of oil to face seals 64 and 72.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to the open-ended terms. Further, the phrase "based on" is intended to mean "based, at least in part, on" unless explicitly stated otherwise.

What is claimed is:

1. A track roller for a ground-engaging track system comprising:
   a roller body defining a roller axis and including a first axial end having a first seal bore formed therein, and a second axial end having a second seal bore formed therein;

a roller shaft extending through the first seal bore and the second seal bore;

a first seal assembly including a first outer seal carrier within the first seal bore and fixed to rotate with the roller body about the roller shaft, a first inner seal carrier fixed to the roller shaft, and a first face seal;

a second seal assembly including a second outer seal carrier within the second seal bore and fixed to rotate with the roller body about the roller shaft, a second inner seal carrier fixed to the roller shaft, and a second face seal;

the first face seal and the second face seal each including an outer seal ring and an outer seal element, supported in the respective outer seal carrier, and an inner seal ring and an inner seal element, supported in the respective inner seal carrier; and each outer seal element is radially inward of the respective outer seal ring and squeezed in radial compression to form a fluid seal with the respective outer seal carrier.

2. The track roller of claim 1 wherein the first outer seal carrier and the second outer seal carrier are interference-fitted with the roller body within the first seal bore and the second seal bore, respectively.

3. The track roller of claim 2 wherein the first inner seal carrier and the second inner seal carrier are interference-fitted upon the roller shaft.

4. The track roller of claim 3 wherein the roller shaft includes a first knurled surface and a second knurled surface, and the first inner seal carrier and the second inner seal carrier are interference-fitted upon the roller shaft upon the first knurled surface and the second knurled surface, respectively.

5. The track roller of claim 1 wherein the roller shaft includes an outer cylindrical surface uninterrupted in profile between the first seal assembly and the second seal assembly.

6. The track roller of claim 1 further comprising a first bearing interference-fitted upon the roller shaft inboard of the first inner seal carrier, and a second bearing interference-fitted upon the roller shaft inboard of the second inner seal carrier.

7. The track roller of claim 6 wherein the first bearing includes a journal sleeve and a projecting thrust flange within the first seal bore and trapped between the roller body and the first inner seal carrier.

8. The track roller of claim 6 wherein the first bearing includes a journal sleeve, and further comprising a floating thrust washer within the first seal bore and trapped between the first inner seal carrier and the roller body.

9. The track roller of claim 8 wherein the floating thrust washer includes a plurality of inside oil grooves forming, together with the roller shaft, a plurality of oil passages.

10. The track roller of claim 1 wherein each inner seal element is radially inward of the respective inner seal ring and squeezed in radial compression to form a seal with the respective inner seal carrier.

11. The track roller of claim 1 wherein each inner seal element is radially outward of the respective inner seal ring and squeezed in radial compression to form a fluid seal with the respective inner seal carrier.

12. The track roller of claim 1 wherein the roller body forms an oil cavity extending circumferentially around the roller shaft, a first oil passage extending from the oil cavity to the first seal bore, and a second oil passage extending from the oil cavity to the second seal bore.

13. A track roller for a ground-engaging track system comprising:

a roller body including an outer tread surface, and an inner surface forming a first seal bore, a second seal bore, and a shaft bore defining a roller axis and extending between the first seal bore and the second seal bore;

a roller shaft;

a seal assembly including an outer seal carrier within the first seal bore and fixed to rotate with the roller body about the roller shaft, and a face seal;

the face seal including an outer seal ring and an outer seal element, supported in the outer seal carrier, and an inner seal ring and an inner seal element, and the outer seal element is radially inward of the outer seal ring and squeezed in radial compression between the outer seal ring and the outer seal carrier.

14. The track roller of claim 13 further comprising a first bearing interference-fitted upon the roller shaft and positioned within the shaft bore, and a second bearing interference-fitted upon the roller shaft and positioned within the shaft bore.

15. The track roller of claim 14 wherein the first bearing includes a journal sleeve upon the roller shaft, and a projecting thrust flange trapped between the seal assembly and the roller body.

16. The track roller of claim 14 wherein the roller body forms an oil cavity extending circumferentially around the roller shaft, and an oil passage extending from the oil cavity to the first seal bore.

17. The track roller of claim 13 wherein the outer seal carrier is interference-fitted with the roller body within the first seal bore, and the seal assembly includes an inner seal carrier interference-fitted upon the roller shaft, and the inner seal ring and the inner seal element are supported in the inner seal carrier.

18. The track roller of claim 13 wherein the roller shaft includes an outer cylindrical surface uninterrupted in profile between the first seal bore and the second seal bore.

19. A body for a track roller in an undercarriage system comprising:

a roller shell defining a roller axis extending between a first roller shell axial end and a second roller shell axial end, and including an outer tread surface extending circumferentially around the roller axis and axially between a first roller shell end flange and a second roller shell end flange;

the roller shell further including a first seal bore formed in the first roller shell axial end, a second seal bore formed in the second roller shell axial end, and a shaft bore extending axially between the first seal bore and the second seal bore and circumferentially around the roller shell axis;

the roller shell further including a centrally located oil cavity in communication with the shaft bore, a first inside bearing surface exposed to the shaft bore and extending axially from the oil cavity to the first seal bore, and a second inside bearing surface exposed to the shaft bore and extending axially from the oil cavity to the second seal bore; and the roller shell further including a first oil channel and a second oil channel, each formed radially outward of the shaft bore, and extending axially between the oil cavity and the first seal bore and the second seal bore, respectively.

20. The body of claim 19 wherein the first oil channel is one of a set of oil passages spaced radially outward of the first inside bearing surface, and the second oil channel is one of a set of oil passages spaced radially outward of the second inside bearing surface.

\* \* \* \* \*